(12) United States Patent
Morita et al.

(10) Patent No.: US 6,814,670 B2
(45) Date of Patent: Nov. 9, 2004

(54) DEVICE FOR CONTROLLING THE AMPLITUDE OF A SWINGING BODY

(75) Inventors: Naohiro Morita, Saitama (JP); Tsutomu Fukasawa, Ibaraki (JP)

(73) Assignees: Rhythm Watch Co., Ltd., Tokyo (JP); Combi Corporation, Tokyo-to (JP)

( * ) Notice: Subject to any disclaimer, the term of this patent is extended or adjusted under 35 U.S.C. 154(b) by 0 days.

(21) Appl. No.: 10/254,769

(22) Filed: Sep. 26, 2002

(65) Prior Publication Data

US 2003/0056288 A1 Mar. 27, 2003

(30) Foreign Application Priority Data

Sep. 26, 2001 (JP) ........................................ 2001-294742

(51) Int. Cl.[7] .............................................. A63G 9/16
(52) U.S. Cl. ................. 472/119; 5/108; 5/109
(58) Field of Search ............................ 5/109, 108, 101; 472/118–119; 446/323; 297/232, 246, 247, 273, 274; 185/27, 59 R, 106, 100.1

(56) References Cited

U.S. PATENT DOCUMENTS 5,525,113 A * 6/1996 Mitchell et al. ............ 472/119
6,561,915 B2 * 5/2003 Kelly et al. ................. 472/119

* cited by examiner

*Primary Examiner*—Teri Pham Luu
*Assistant Examiner*—Fredrick Conley
(74) *Attorney, Agent, or Firm*—Birch, Stewart, Kolasch & Birch, LLP

(57) ABSTRACT

A device for controlling the amplitude of a swinging body. The device accurately controls the drive thereof in response to the load the swinging body carries even if it carries infants of different weights. A desired swing is provided by a sensor portion which generates first and second pulse signals having different phases in response to the swing and a control circuit which obtains sensor data based on the first pulse signal and the second pulse signal, decodes data patterns set in advance which corresponds to a combination of the sensor data, judges a swing direction or a change thereof from a changed pattern of the continuous data patted, reads a target value (pulse count number) set in advance to compare or the like with the pulse count number of the present, the previous, and the one before the previous to obtain a pulse width for driving at the next timing, and outputs a drive pulse of the obtained pulse width to a drive circuit so that driving can be performed in accordance with the expected value of the swing set in advance.

9 Claims, 17 Drawing Sheets

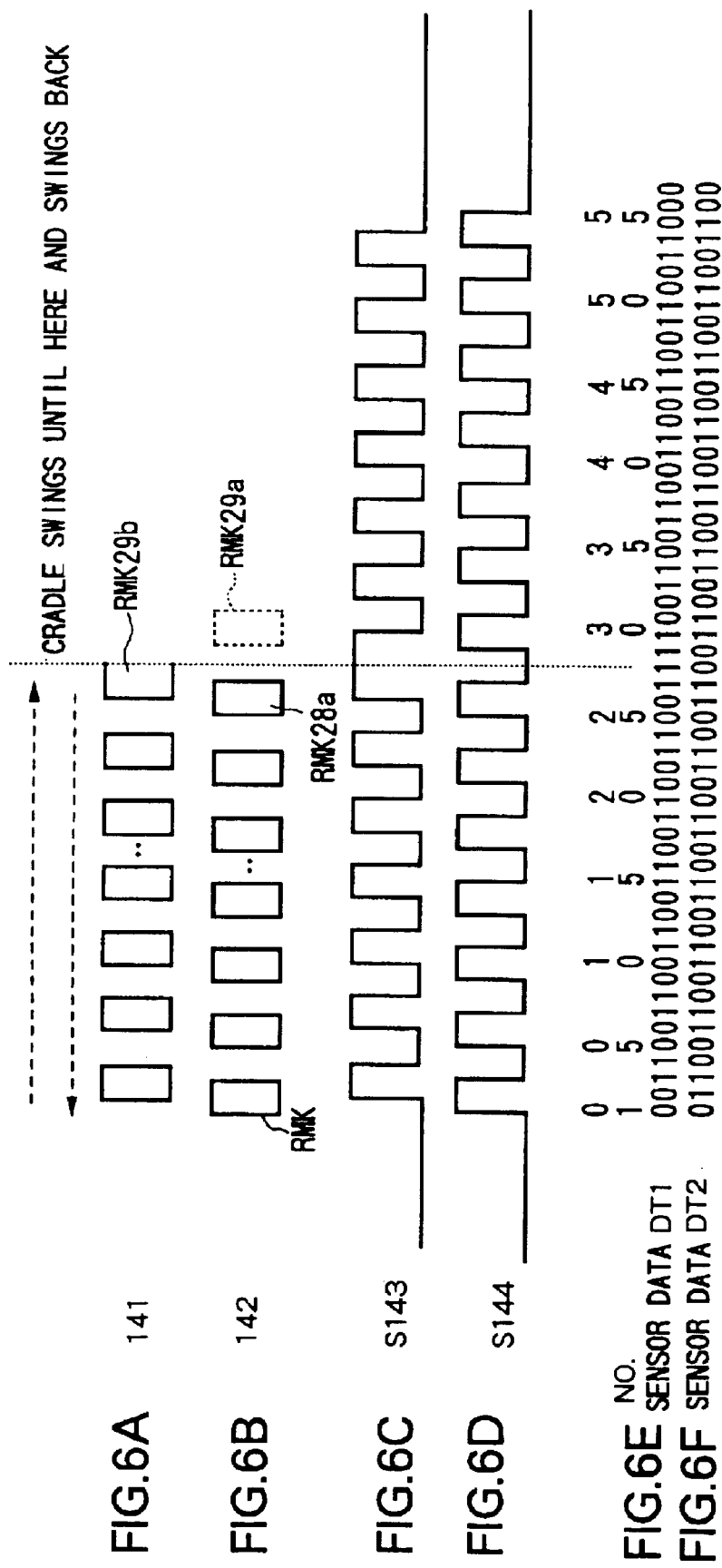

FIG. 7

| No. | SENSOR DATA DT1 | SENSOR DATA DT2 | DATA PATTERN DP No | DESCRIPTION |
|---|---|---|---|---|
| 1 | 0 | 0 | 4 | 4→1 IS POSITIVE DIRECTION |
| 2 | 1 | 0 | 1 | 1→2 IS POSITIVE DIRECTION |
| 3 | 1 | 1 | 2 | 2→3 IS POSITIVE DIRECTION |
| 4 | 0 | 1 | 3 | 3→4 IS POSITIVE DIRECTION |
| 5 | 0 | 0 | 4 | HEREAFTER REPEAT |
| 6 | 1 | 0 | 1 | |
| ... | ... | ... | ... | |
| 25 | 0 | 0 | 4 | 4→1 IS POSITIVE DIRECTION |
| 26 | 1 | 0 | 1 | 1→2 IS POSITIVE DIRECTION |
| 27 | 1 | 1 | 2 | 2→3 IS POSITIVE DIRECTION |
| 28 | 1 | 1 | 3 | --- SWING DIRECTION REVERSES HERE |
| 29 | 0 | 1 | 3 | |
| 30 | 0 | 0 | 2 | 3→2 IS NEGATIVE DIRECTION |
| 31 | 1 | 0 | 1 | 2→1 IS NEGATIVE DIRECTION |
| 32 | 1 | 0 | 4 | 1→4 IS NEGATIVE DIRECTION |
| 33 | 0 | 1 | 3 | 4→3 IS NEGATIVE DIRECTION |
| 34 | 0 | 1 | 2 | HEREAFTER REPEAT |
| ... | ... | ... | ... | |
| 50 | 1 | 1 | 2 | 2→1 IS NEGATIVE DIRECTION |
| 51 | 1 | 0 | 1 | 1→4 IS NEGATIVE DIRECTION |
| 52 | 0 | 0 | 4 | 4→3 IS NEGATIVE DIRECTION |
| 53 | 0 | 1 | 3 | 3→2 IS NEGATIVE DIRECTION |
| 54 | 1 | 1 | 2 | 2→1 IS NEGATIVE DIRECTION |
| 55 | 1 | 0 | 1 | 1→4 IS NEGATIVE DIRECTION |
| 56 | 0 | 0 | 4 | |

DEVICE FOR CONTROLLING THE AMPLITUDE OF A SWINGING BODY

BACKGROUND OF THE INVENTION

1. Field of the Invention

The present invention relates to a control device for controlling the amplitude of a swinging body such as a cradle.

2. Description of the Related Art

From the outset an infant chair having an infant sitting therein can be moved, however, in recent years, an infant chair functionable as a cradle has been provided for practical use.

A drive system of the infant chair is composed of a drive solenoid incorporated in the infant chair, a photodiode for detecting the center of swing, or the like.

FIG. 1 is a block diagram showing an example of the configuration of a swing control device in a conventional infant chair driving system.

As shown in FIG. 1, a swing control device 1 has a cradle 2, a photo sensor 3, a timer 4, and a solenoid drive circuit 5.

In the swing control device 1, the cradle 2 carrying an infant swings and, for example, when it passes a center of the swing, the center of the swing is detected by the photodiode 3, whereby a detecting signal S3 is output to the timer 4.

Upon inputting the detecting signal S3 to the timer 4, a fixed drive pulse S4 determined by a not illustrated set volume is generated and output to the drive circuit 5.

The drive circuit 5 receives the drive pulse S4 and drives an end portion of the cradle (push or pull) with a driving force determined in advance, whereby the cradle 2 is swung.

However, in the above described conventional swing control device 1, the weight of an infant being carried, in other words, despite the way the cradle 2 swings differently in response to the load it carries, because the solenoid is driven by the fixed drive pulse S4 based on the detecting signal S3 of the built-in photodiode 3 which indicates that it has detected the center of the swing, the width of the swing is changed by the weight of the infant in the cradle 2. Thus there is a disadvantage in that control of the swing cannot be carried out as expected.

Also, since the solenoid is driven by the fixed drive pulse S4, there is a disadvantage in that only a monotonous swing can be realized.

SUMMARY OF THE INVENTION

An object of the present invention is to provide a swing control device of a swinging body capable of accurately controlling the drive thereof in response to the load the swinging body carries even if it carries infants of different weights, and realizing a desired swing.

To achieve the above objects, according to an aspect of the present invention, there is provided a swing control device of a swinging body that swings in a direction opposite each other centering on a predetermined axis, comprising a driving means for driving the swinging body with a driving power corresponding to a supplied drive pulse, a sensor portion for detecting a swing width of the swinging body, and a controlling means for obtaining a pulse width for driving the swinging body at the next timing on the basis of the swing width detected by the sensor portion and an expected value of a swing set in advance to generate the drive pulse and supplying the drive pulse to the driving means.

Preferably, the sensor portion comprises a plurality of optical transmission mark rows in which a plurality of optical transmission marks transmitting irradiated light in a predetermined direction are arranged with predetermined intervals in the swing direction of the swinging body and the optical transmission marks of each row are arranged to be shifted at a predetermined pitch, and a plurality of optical sensors which irradiate light to each of the rows of optical transmission marks and receives the light transmitted by the optical transmission marks to output pulse signals in response to the received light level, and the controlling means obtains sensor data based on the pulse signals output by the plurality of optical sensors, decodes data patterns set in advance which corresponds to a combination of the sensor data, judges a swing direction from a changed pattern of the continuous data pattern, compares a target value set in advance with at least a present and previous drive value to obtain a pulse width for driving at the next timing, and outputs a drive pulse of the obtained pulse width to the driving means so that driving can be performed in accordance with an expected value of the swing set in advance.

Preferably, the sensor portion comprises a first optical transmission mark row in which a plurality of optical transmission marks transmitting irradiated light in a predetermined direction are arranged with predetermined intervals in the swing direction of the swinging body, a second optical transmission mark row arranged in parallel with respect to the first optical transmission mark row and in which a plurality of optical transmission marks are arranged with predetermined intervals in the swing direction and the optical transmission marks are arranged to be shifted at a predetermined pitch with respect to those of the first optical transmission mark row, a first optical sensor which irradiates light to the first optical transmission mark row and receives the light transmitted by the optical transmission marks to output a first pulse signal in response to the received light level, and a second optical sensor which irradiates light to the second optical transmission mark row and receives the light transmitted by the optical transmission marks to output a second pulse signal in response to the received light level, and the controlling means obtains sensor data based on the first and second pulse signals, decodes data patterns set in advance which corresponds to a combination of the first and second sensor data, judges a swing direction from a changed pattern of the continuous data pattern, reads a target value from a table set in advance to compare with a present drive value and at least a previous drive value to obtain a pulse width for driving at the next timing, and outputs a drive pulse of the obtained pulse width to the driving means so that driving can be performed in accordance with an expected value of the swing set in advance.

Preferably, the target value and drive value comprise a pulse count number.

Preferably, the controlling means sets a pulse width with the addition of a 1/f fluctuation.

According to the present invention, when a swinging body swings, a plurality of pulse signals with the phases thereof shifted are generated in the sensor portion and output to the controlling means.

At the controlling means, sensor data are obtained based on the pulse signals by the plurality of optical sensors, and data patterns, which are set in advance, corresponding to the combination of sensor data are decoded.

The direction of the swing is then judged by the changed pattern of the continuous data pattern. Further, a target value set in advance is compared with at least a previous drive value and the present drive value to obtain a pulse width for driving at the next timing so that driving is performed in accordance with an expected value of the swing set in advance. The drive pulse of the obtained pulse width is output to the driving means.

Due to this, accurate driving control in response to the load becomes possible even if it carries infants having different weights, whereby high precision swinging is realized.

BRIEF DESCRIPTION OF THE DRAWINGS

The above and other objects and features of the present invention will be apparent more in detail with reference to the accompanying drawings, in which:

FIGS. 6A to 6F are views showing waveform examples of pulse signals S143 and S144 when the infant chair is swinging as a cradle, and sensor data recognized in the control circuit;

FIG. 7 is a view for explaining sensor data DT1 and DT2 obtained in a drive circuit and data pattern corresponding thereto, and a judging standard of a swing direction according to the present embodiment;

DESCRIPTION OF THE PREFERRED EMBODIMENTS

Figure 1:
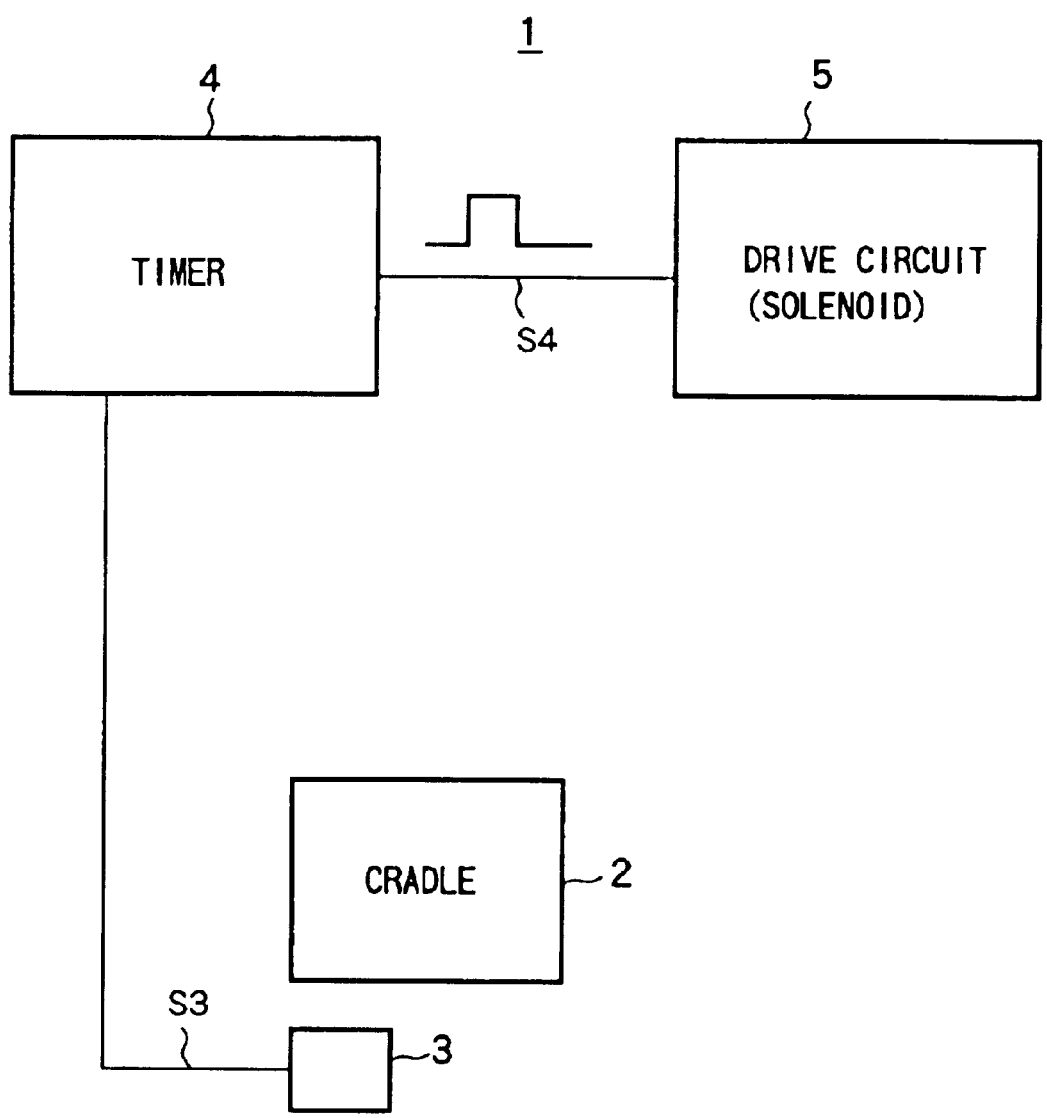
FIG. 1 is a block diagram showing an example of the configuration of a swing control device in a conventional infant chair system.
Figure 2:
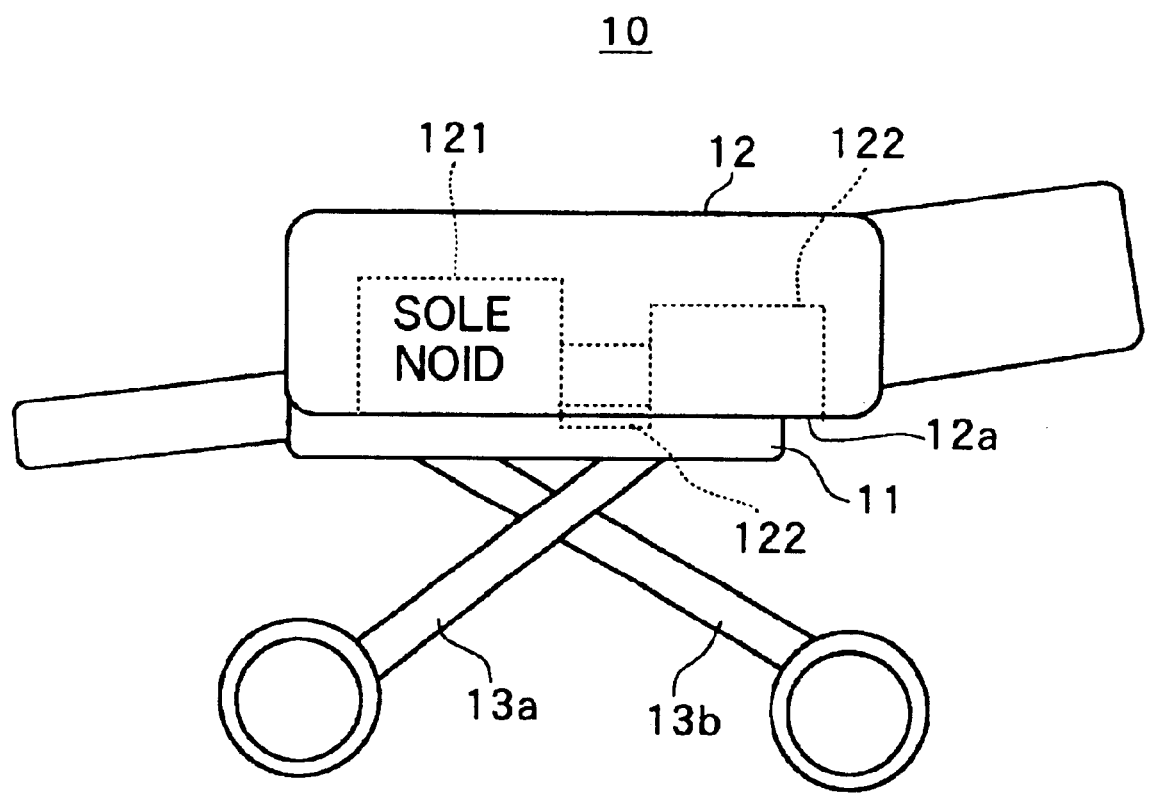
FIG. 2 is a schematic view showing an infant chair driving system having a cradle mounted thereon as a swinging body according to a first embodiment of the present invention.
Figure 3:
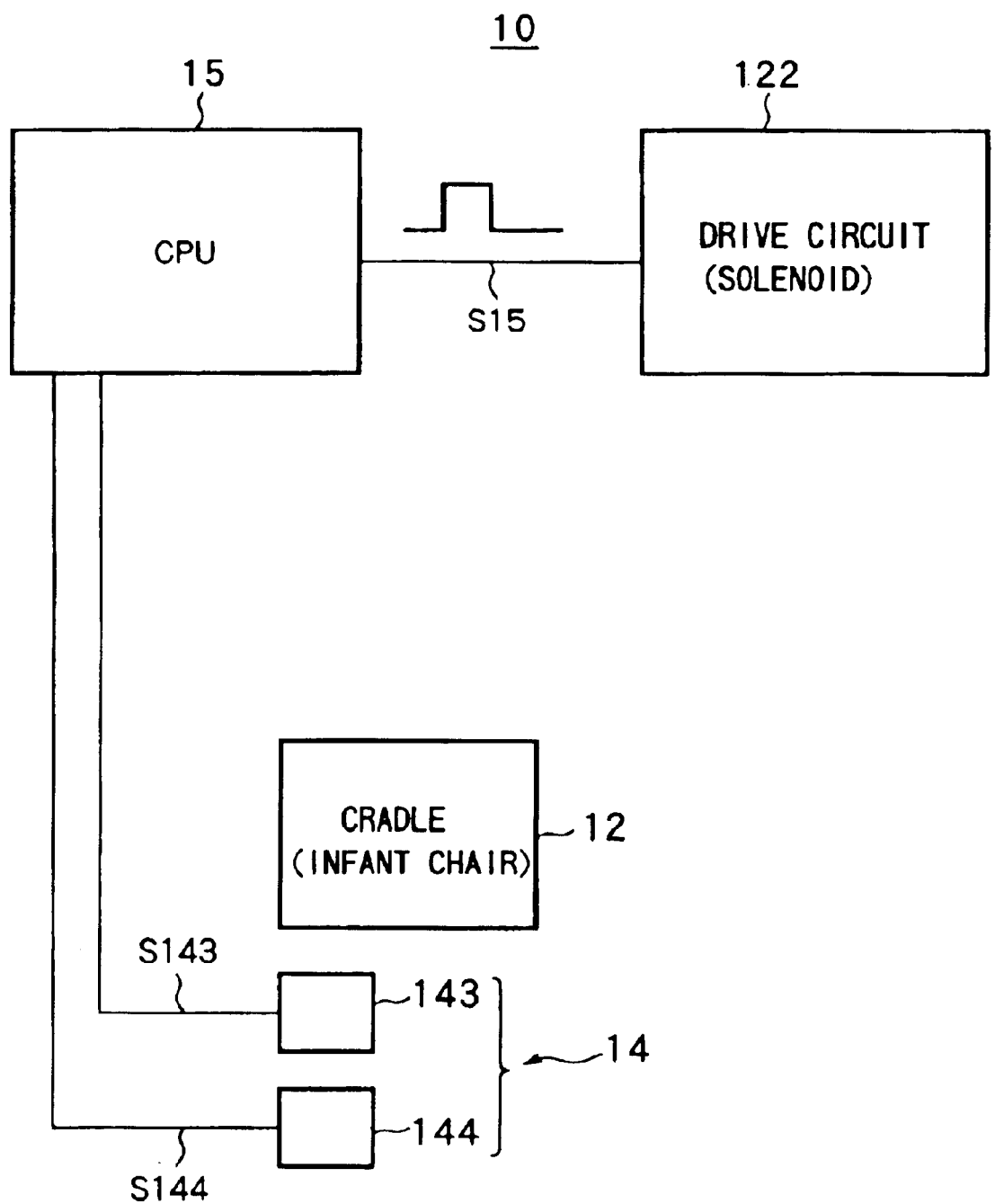
FIG. 3 is a block diagram showing principal parts of the infant chair driving system according to the present invention.
Figure 4:
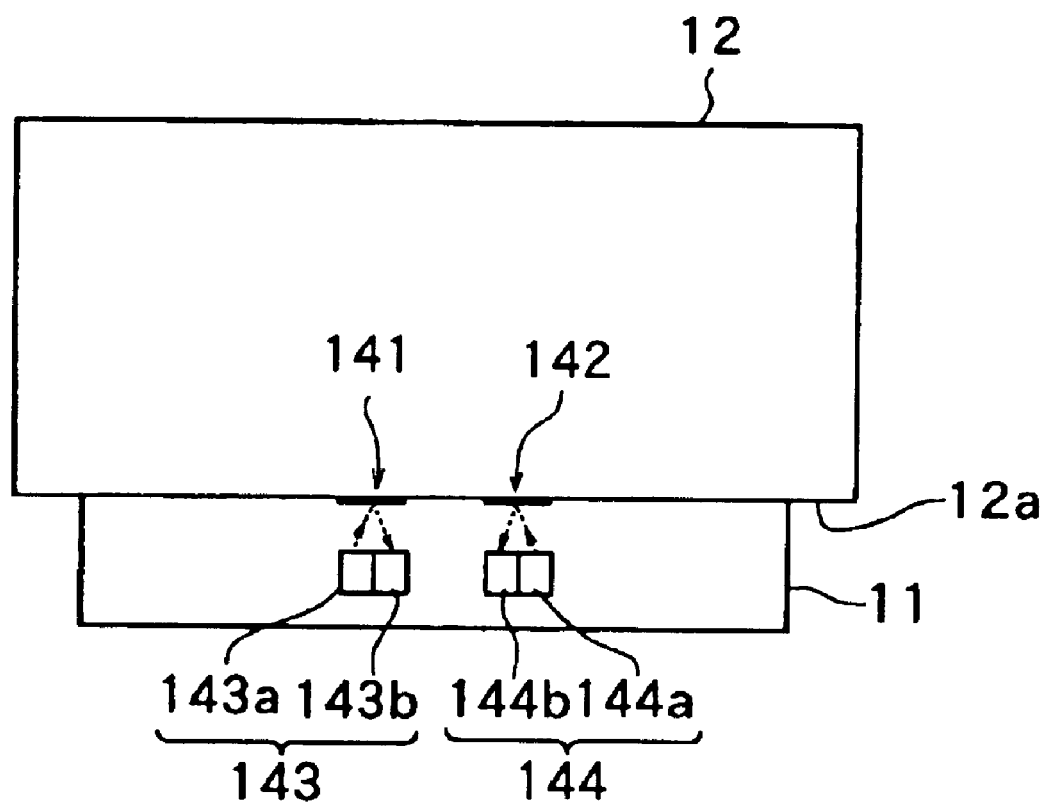
FIG. 4 is a view for explaining the arrangement relation of each of the constitutive elements of a sensor portion according to the present embodiment.

FIG. 2 is a schematic view showing an infant chair driving system with a cradle mounted thereon as a swinging body according to a first embodiment of the present invention, and FIG. 4 is a block diagram showing the principal parts of the infant chair driving system of the present invention.

In the present infant chair driving system 10, as shown in FIG. 2, an infant chair 12 functionable as a cradle is mounted on a top portion of a base board 11 in such a manner that it can be selectively set to a fixable and swingable state.

Also, a pair of foldable driving wheel parts 13a and 13b is attached to a bottom portion side of the base board 11.

In the infant chair driving system 10, the infant chair 12 is configured so that it is possible to fixedly mount, as described above, by a not illustrated fixing portion and when displaying its function as a cradle, the fixed state due to the fixing portion is released so that it swings in a direction opposite each other (in FIG. 2, to the left and right direction) centering on an unillustrated predetermined axis.

A drive solenoid 121 and a drive circuit 122 thereof are built in the infant chair 12. Further, at a bottom surface of the infant chair 12, a part of a sensor portion 14 for generating a pulse signal that is appropriate to the swinging width of the infant chair 12 is mounted thereon.

Also, a part of the sensor portion 14, a control system including a control circuit 15 as a controlling means for performing the drive control of the infant chair 12, and power source or the like are mounted on the base board 11.

The solenoid 121 is structured so that a movable portion thereof is, for example, formed of 2 iron cores and has an opening at the center, and at the periphery of the center, power is constantly applied in the direction of making the swing of the infant chair 12 larger.

FIG. 4 is a view for explaining the arrangement relationship of each of the constitutive elements of the sensor 14.

Note that in FIG. 4, the vertical direction with respect to the surface of the paper is the swing direction of the infant chair 12.

As shown in FIG. 4, the sensor portion 14 has a first reflection mark row 141 serving as a first optical transmission mark row, a second reflection mark row 142 serving as a second optical transmission mark row, a first reflection optical sensor 143, and a second reflection optical sensor 144.

The first reflection mark row 141 and the second reflection mark row 142 are arranged in parallel to each other with a predetermined interval at approximately a center portion of the swing direction of a bottom surface 12a of the infant chair 12.

Figure 5:
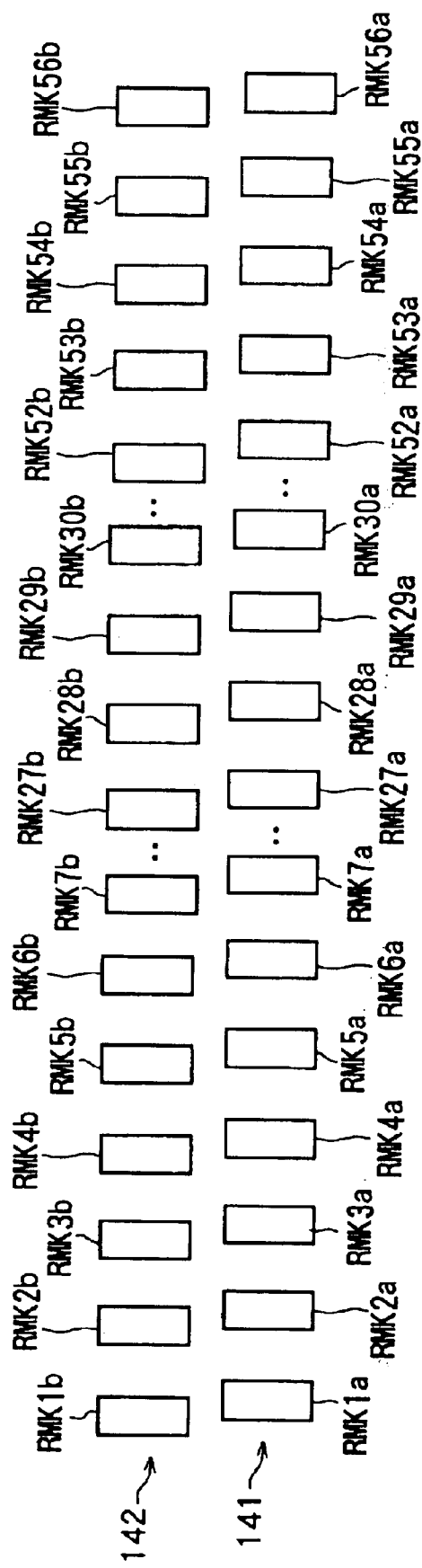
FIG. 5 is view showing examples of a configuration of a first reflection mark row and a second reflection mark row according to the present embodiment.

FIG. 5 is a view showing examples of the configurations of the first reflection mark row 141 and the second reflection mark row 142.

As shown in FIG. 5, a plurality of, for example, 56 reflection marks RMK1a to RMK56a and RMK1b to RMK56b as optical transmission marks having rectangular shape with predetermined widths and specular surfaces are arranged with predetermined intervals in the first reflection mark row 141 and the second reflection mark row 142.

Each of the reflection marks of the first reflection mark row 141 and the second reflection mark row is configured so that a phase is shifted at half pitch phase from each other, more specifically, the phase of the reflection marks RMK1a to RMK56a of the first reflection mark row 141 is configured so that it is delayed a half pitch from the phase of the reflection marks RMK1b to RMK56b of the second reflection mark row 142.

The first reflection optical sensor 143, as shown in FIG. 4, has a light-emitting element 143a and a light-receiving element 143b, receives the reflected light which is emitted from the light-emitting element 143a and then reflected at the first reflection mark row 141 by the light-receiving element 143b, and outputs a first pulse signal S143 in response to the level of light received to the control circuit 15.

The second reflection optical sensor 144, as shown in FIG. 4, has a light-emitting element 144a and a light-receiving element 144b, receives the reflected light which is emitted from the light-emitting element 144 and then reflected at the second reflection mark row 142 by the light-receiving element 144b, and outputs a second pulse signal S144 in response to the level of light received to the control circuit 15.

FIGS. 6A to 6F are views showing waveform examples of the first and the second pulse signals S143 and S144 when the infant chair 12 functioning as a cradle is swinging, and the sensor data recognized in the control circuit 15.

In FIGS. 6A to 6F, FIG. 6A shows the first reflection mark row 141 which is simplified, FIG. 6B shows the second reflection mark row 142 which is simplified, FIG. 6C shows the first pulse signal S143 output from the first reflection optical sensor 143, FIG. 6D shows the second pulse signal S144 output from the second reflection optical sensor 144, FIG. 6E shows a sensor data DT1 recognized from the first pulse signal S143, and FIG. 6F shows a sensor data DT2 recognized from the second pulse signal S144.

In the present embodiment, in the following description, it is assumed that the infant chair will swing until close to the reflection marks RMK28a, RMK29a and RMK28b, RMK29b at approximately the center portion of the first and second reflection mark rows 141 and 142 and then back.

As shown in FIGS. 6C and 6D, the first pulse signal S143 and the second pulse signal S144 have become waveforms with half pitch phase shifts.

Concretely, the second pulse signal S144 rises a half pitch earlier than the first pulse signal S143, and after the first pulse signal S143 has risen, the second pulse signal S144 falls a half pitch late.

Therefore, as shown in FIGS. 6E and 6F, when both pulse signals are at a low level, the sensor data DT1 and DT2 become "00", when the first pulse signal S143 is at a low level and the second pulse signal S144 is at a high level, the sensor data DT1 and DT2 become "01", when the first pulse signal S143, is at a high level and the second pulse signal S144 is at a low level, the sensor data DT1 and DT2 become "10", and when both pulse signals are at a high level, the sensor data DT1 and DT2 become "11".

The control circuit 15 receives the first pulse signal S143 by the first reflection optical sensor 143 of the sensor portion 14 and the second pulse signal S144 by the second reflection optical sensor 144 thereof to thereby obtain the sensor data DT1 and DT2 based on both pulse signals, decodes a data pattern DP set in advance in response to the combination of the sensor data DT1 and DT2, judges the direction or change of the swing from the changed pattern of the continuous data pattern DP, reads a target value (for example, pulse count number) from a table set in advance to perform comparison or the like with the pulse count number of the present, the previous, and the one before the previous to obtain a pulse width for driving at the next timing, and outputs a drive pulse S15 of the obtained pulse width to the drive circuit 122 so that driving is performed in accordance with a swing expected value set in advance,.

FIG. 7 is a view for explaining the sensor data DT1 and DT2 obtained in the control circuit 15, data pattern corresponding to the sensor data DT1 and DT2, and the judging standard of the swing direction.

As described above, when the two pulse signals, that is, the first pulse signal S143 and the second pulse signal S144 are at a low level, the sensor data DT1 and DT2 becomes "00", when the first pulse signal S143 is at a low level and the second pulse signal S144 is at a high level, the sensor data DT1 and DT2 become "01". When the first pulse signal S143 is at a high level and the second pulse signal S144 is at a low level, the sensor data DT1 and DT2 become "10", and when both pulse signals are at a high level, the sensor data DT1 and DT2 become "11".

That is, as the data pattern DP, it takes 4 patterns of "00", "01", "10", and "11".

In the present embodiment, as shown in FIG. 7, when the sensor data DT1 and DT2 are "00", a data pattern DP4 is taken, when the sensor data DT1 and DT2 are "10", a data pattern DP1 is taken, when the sensor data DT1 and DT2 are "11", a data pattern DP2 is taken, and when the sensor data DT1 and DT2 are "01", a data pattern DP3 is taken.

Then, in the present embodiment, as shown in FIG. 7, swinging is judged positive (normal) direction swing (for example, the direction is a driving direction of the solenoid 121) when changing from the data pattern DP4 to the data pattern DP1, judged normal direction swing also when changing from the data pattern DP1 to the data pattern DP2, judged normal direction swing also when changing from the data pattern DP2 to the data pattern DP3, and judged normal direction swing also when changing from the data pattern DP3 to the data pattern DP4.

Further, swinging is judged as negative (reverse) direction swing when changing from the data pattern DP3 to the data pattern DP2, judged reverse direction swing also when changing from the data pattern DP2 to the data pattern DP1, judged reverse direction swing also when changing from the data pattern DP1 to the data pattern DP4, and judged reverse direction swing also when changing from the data pattern DP4 to the data pattern DP3.

The drive circuit 122 drives the infant chair 12 serving as a cradle with a driving power that is in accordance with the pulse width of the drive pulse S15.

Next, a concrete operation of the swing control device according to the present embodiment will be explained centering on the control operation of the control circuit with reference to the flow charts of FIG. 8 to FIG. 13.

Note that, here, it is assumed that the infant chair 12 functionable as a cradle is selectively set in a swingable state.

Figure 8:
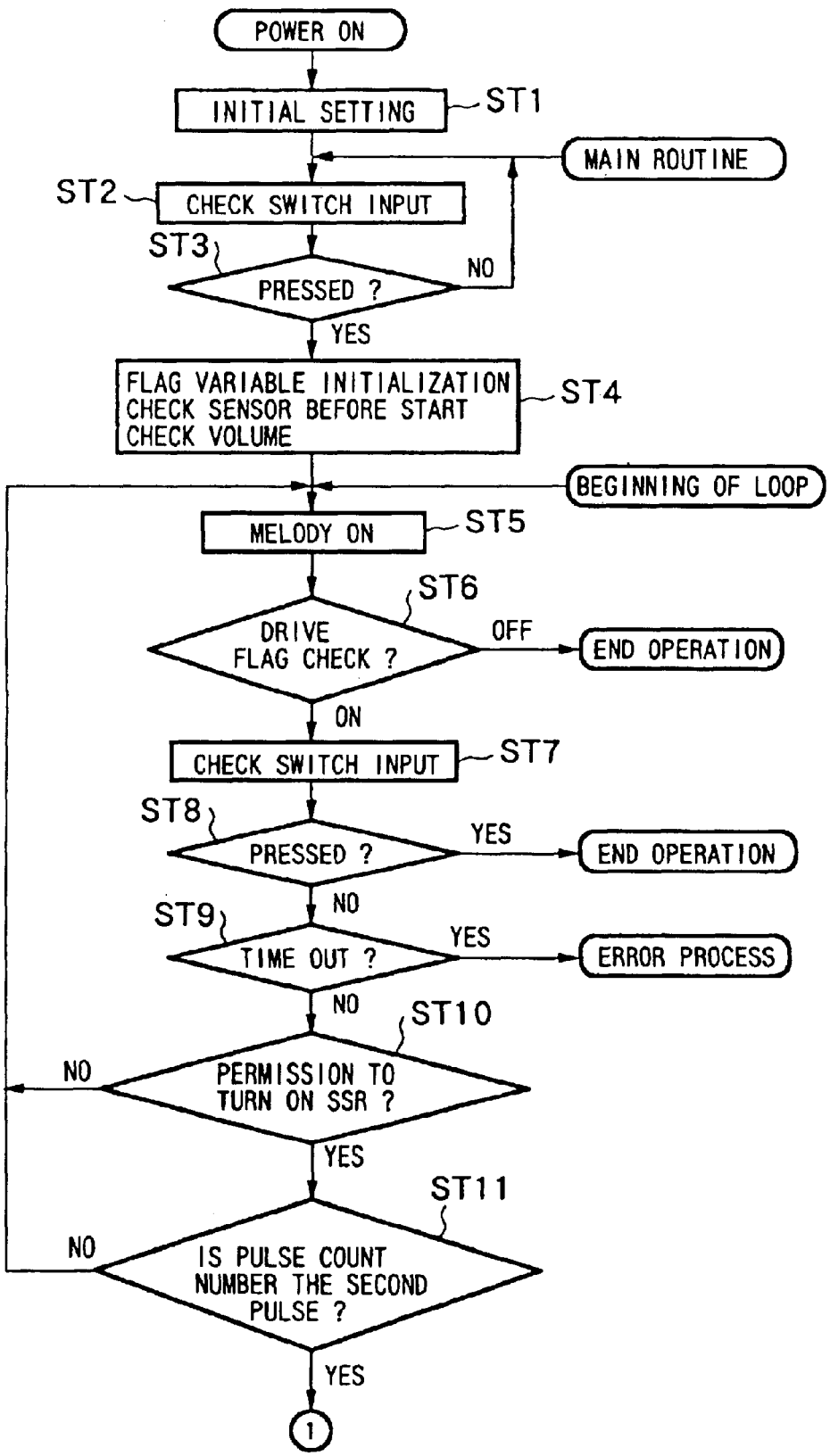
FIG. 8 is a flow chart for explaining an operation of the swing control device according to the present embodiment.

First, as shown in FIG. 8, upon turning ON a not illustrated power source, initial setting of each part is performed (ST1), and judgment is made as to whether or not a switch for starting the operation of the cradle is input (ST2, ST3). Note that with every press of the switch, start input and stop input will be alternately carried out.

In step ST3, when it is judged that the switch is pressed and input, flag variable initialization, checking of sensor prior to start, and volume check are carried out (ST4).

Then, for example a not illustrated melody generating portion is driven, rendering the melody to be turned ON (state in which melody is generated) (ST5), and a drive flag is checked (ST6).

In step ST6, when it is judged that the drive flag is turned ON, then judgment as to whether or not the switch is input again is carried out (ST7, ST8).

In step ST8, when it is judged that the switch is not pressed and when it is not timeout (ST9), permission to turn ON the solid state relay (hereinafter referred to as SSR) for generating the drive pulse signal S15 is output (ST10). Due to this, an SSR permission flag is rendered ON.

Subsequently, if for example the pulse count number becomes the second pulse (S11), the operation shifts to the process of step ST12, whereby the SSR is turned ON.

Then, when it is not timeout (ST13) and the SSR is not in a prohibited state (ST14), the drive pulse S15 of the pulse number to be driven is generated and output to the drive circuit 122, whereby the infant chair 12 is driven by the solenoid 121 (ST15).

Due to this, the infant chair 12 starts to swing and the first pulse signal S143 by the first reflection optical sensor 143 and the second pulse signal S144 by the second reflection optical sensor 144, of which phases are shifted at a half pitch, are input to the control circuit 15 with predetermined patterns.

Thus, after driving the solenoid 121 with a predetermined driving power, the SSR is rendered OFF and the SSR permission flag is also rendered OFF (ST16).

Here, it is judged whether or not the switch is input again (ST17, ST18).

In step ST18, when it is judged that the switch is not pressed, then whether the swing direction is the reverse direction or not is judged (ST19, ST20).

Figure 9:
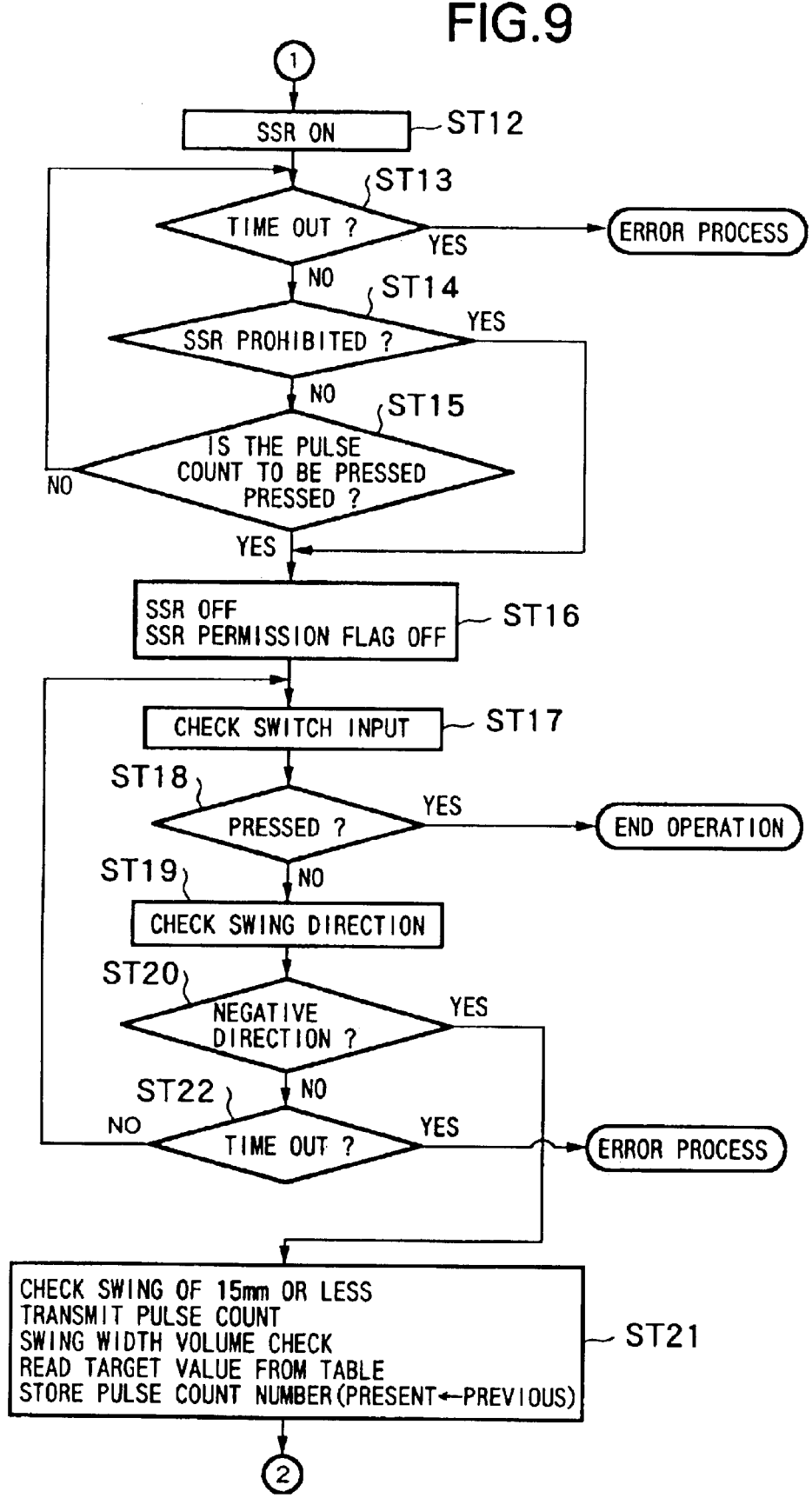
FIG. 9 is a flow chart for explaining an operation of the swing control device according to the present embodiment.
Figure 10:
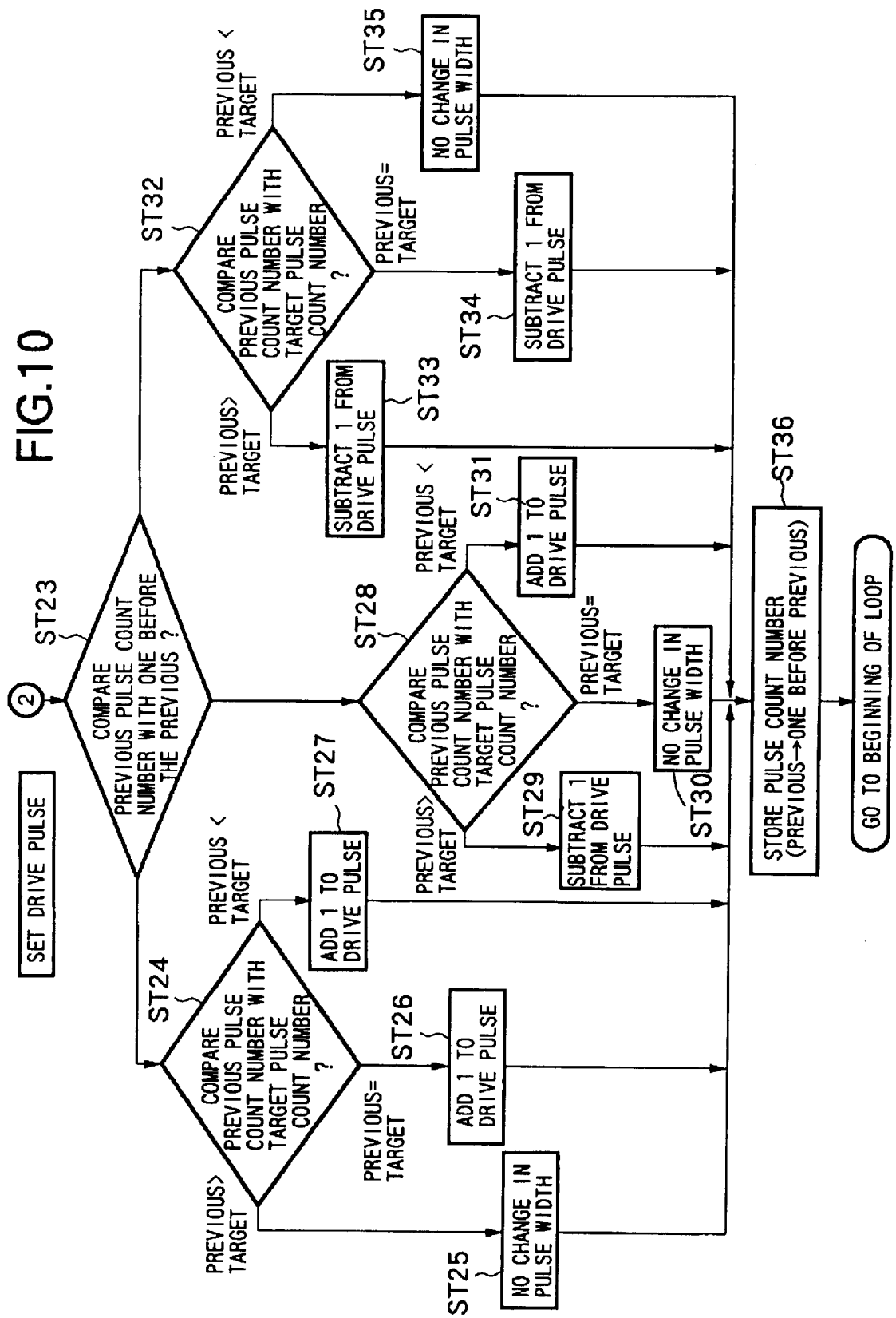
FIG. 10 is a flow chart for explaining an operation of the swing control device according to the present embodiment.

In step ST20, when it is judged from the data pattern DP based on the sensor data of the first pulse signal S143 by the first reflection optical sensor 143 and the second pulse signal S144 by the second reflection optical sensor 144 that swinging is in the reverse direction, then for example, if it is judged that the swing is equal to or less than 15 mm, the operation of pulse number transmission and swing width volume check not shown in the drawing are carried out, a target value of the swing is read from a table set in advance, and operation shifts to the process of step ST23 shown in FIG. 9 after the pulse count number is stored.

On the other hand, in step ST20, when it is judged that swinging is not in the reverse direction, unless it is timeout, processes from step ST17 are repeated.

In step ST23, a previous pulse count number (drive value) and one before the previous pulse count number are compared.

In step ST23, when it is judged that the pulse count number before the previous pulse count number is greater than the previous pulse count number, the previous pulse count number and the target pulse count number are compared (ST24).

In step ST24, when the previous pulse count number is greater than the target pulse count number, the pulse number of the drive pulse is not changed (ST25) and the pulse count is stored (ST36).

In step ST24, when the previous pulse count number and the target pulse count number are equal, 1 is added to the pulse number of the drive pulse (ST26) and the pulse count is stored (ST36).

In step ST24, when the previous pulse count number is smaller than the target pulse count number, 1 is added to the pulse number of the drive pulse and the pulse count is stored (ST36).

In step ST23, when the one before the previous pulse count number and the previous pulse count number are equal, the previous pulse count number and the target pulse count number are compared (ST28).

In step ST28, when the previous pulse count number is greater than the target pulse count number, 1 is subtracted from the pulse number of the drive pulse (ST29), and the pulse count is stored (ST36).

In step ST28, when the previous pulse count number and the target pulse count number are equal, the pulse number of the drive pulse is not changed (ST30), and the pulse count is stored (ST36).

In step ST28, when the previous pulse count number is smaller than the target pulse count number, 1 is added to the pulse number of the drive pulse (ST31), and the pulse count is stored (ST36).

In step ST23, when it is judged that the one before the previous pulse count number is smaller than the previous pulse count number, the previous pulse count number and the target pulse count number are compared (ST32).

In step ST32, when the previous pulse count number is greater than the target pulse count number, 1 is subtracted from the pulse number of the drive pulse (ST33), and the pulse count is stored (ST36).

In step ST32, when the previous pulse count number and the target pulse count number are equal, 1 is subtracted from the pulse number of the drive pulse (ST34), and the pulse count is stored (ST36).

In step ST32, when the previous pulse count number is smaller than the target pulse count number, the pulse number of the drive pulse is not changed (ST35), and the pulse count is stored (ST36).

Then, when the process of step ST36 ends, the operation goes to the head of the loop, that is, the process of step ST5 of FIG. 7.

Figure 11:
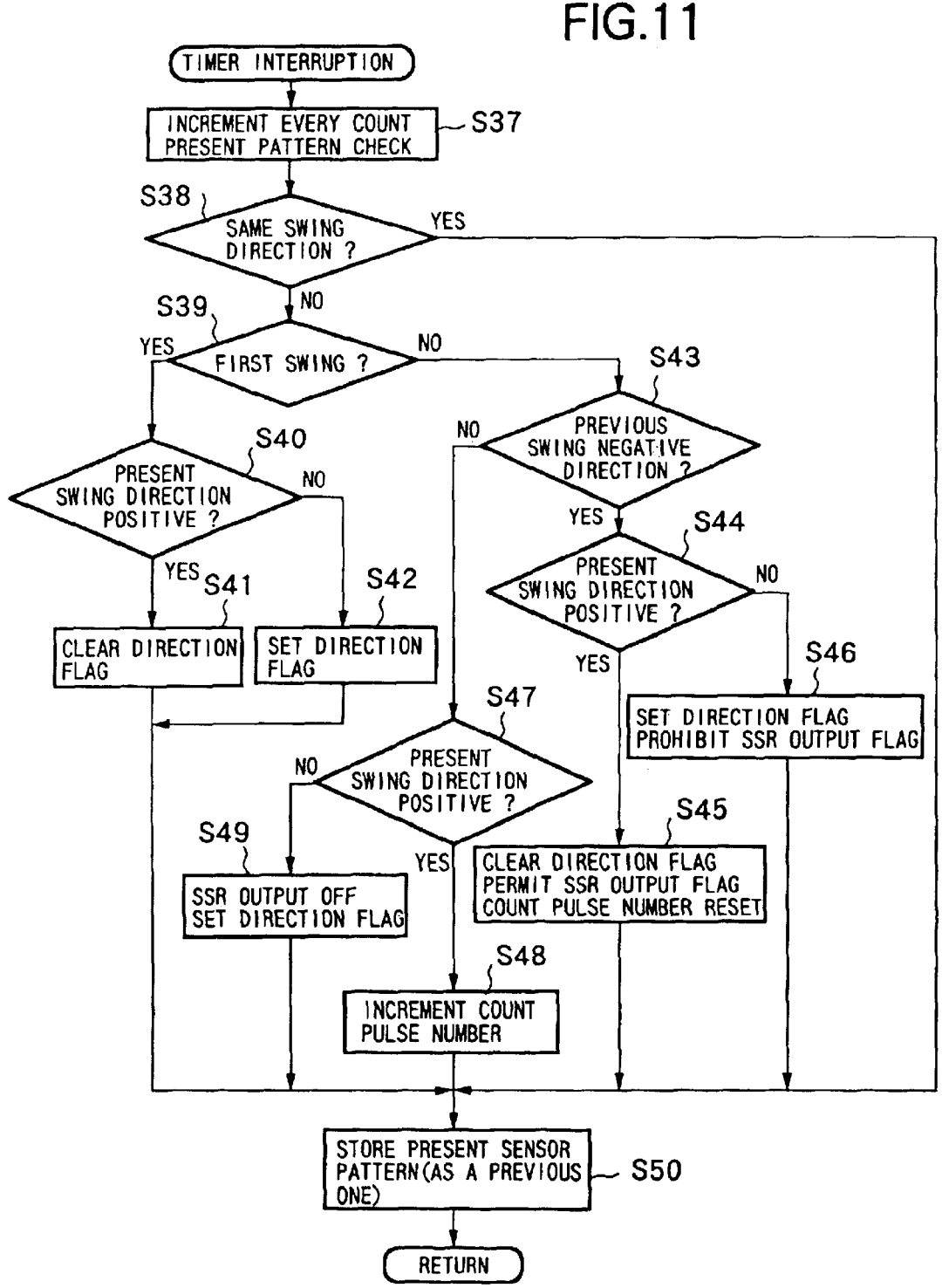
FIG. 11 is a flow chart for explaining an operation of the swing control device according to the present embodiment.

Also, a timer interruption process as shown in FIG. 11 is carried out in the control circuit 15.

In this case, every counter is incremented and the present pattern is checked (ST37).

Next, judgment is made as to whether the swing direction is the same or not (ST38).

In step ST38, when it is judged that the swing direction is different, then judgment is made as to whether the swing is the Ith time or not (ST39).

In step ST39, when it is judged that the swing is the Ith time swing, then judgment is made as to whether the direction of the present swing is normal or not (ST40).

In step ST40, when it is judged that the direction of swing is normal, the direction flag is cleared (ST41) and the present sensor pattern is stored (ST50). The stored sensor pattern will be recognized as the previous pattern in the next operation.

In step ST40, when it is judged that the direction of swing is not normal, the direction flag is set (ST42) and the present sensor pattern is stored (ST50). The stored sensor pattern will be recognized as the previous pattern in the next operation.

In step ST39, when it is judged that the swing is not the Ith time swing, then judgment is made as to whether the direction of the previous swing was in the reverse direction or not (ST43).

In step ST43, when it is judged that the swing is in the reverse direction, then judgment is made as to whether the direction of the present swing is normal or not (ST44).

In step ST44, when it is judged that the direction of swing is normal, the direction flag is cleared, the SSR output flag permission is output, the count pulse number is reset (ST45), and the present sensor pattern is stored (ST50). The stored sensor pattern will be recognized as the previous pattern in the next operation.

In step ST44, when it is judged that the direction of swing is not normal, then the direction flag is set, the SSR output flag prohibition is output (ST46), and the present sensor pattern is stored (ST50). The stored sensor pattern will be recognized as the previous pattern in the next operation In step ST43, when it is judged that the direction of swing is in the reverse direction, then judgment is made as to whether the direction of the present swing is normal or not (ST47).

In step ST47, when it is judged that the present direction of swing is normal, then the count pulse number is incremented (ST48) and the present sensor pattern is stored (ST50). The stored sensor pattern will be recognized as the previous pattern in the next operation.

In step ST47, when it is judged that the direction of swing is not normal, then the direction flag is set, the SSR output flag is turned OFF (ST49), and the present sensor pattern is stored (ST50). The stored sensor pattern will be recognized as the previous pattern in the next operation.

Figure 12:
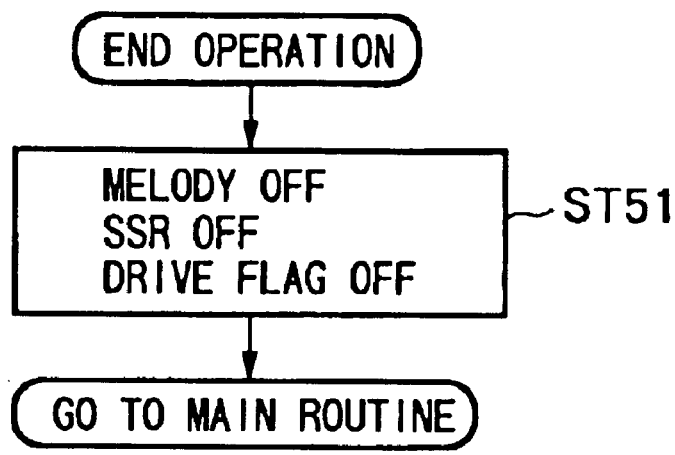
FIG. 12 is a flow chart for explaining an operation of the swing control device according to the present embodiment.

Further, when it is judged in step ST6 that a drive flag is in the OFF state and when after the operation has started it is judged in steps ST9 and ST18 that the switch is input again, then the operation end process shown in FIG. 12 is performed (ST51).

Concretely, the processes of turning OFF the melody, the SSR, and the drive flag are carried out.

Figure 13:
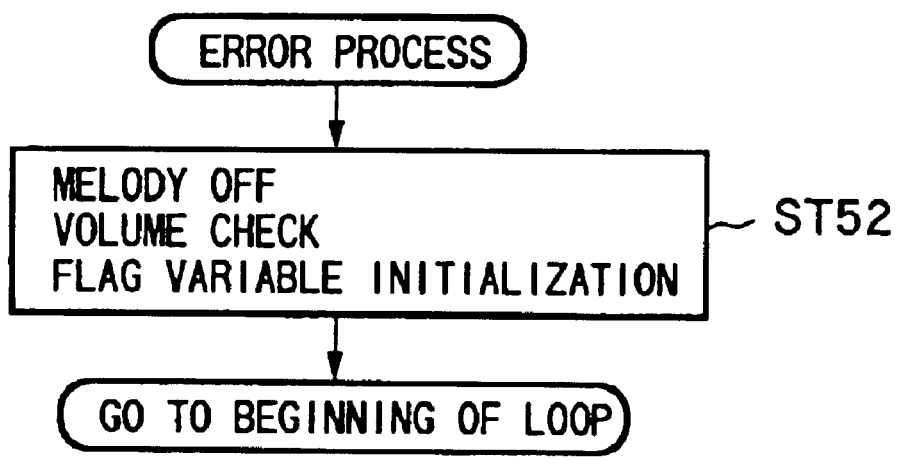
FIG. 13 is a flow chart for explaining an operation of the swing control device according to the present embodiment.

Also, in steps ST9, ST13, and ST22, when it is judged timeout, the error process shown in FIG. 13 is performed (ST52).

Concretely, the processes of turning OFF the SSR, the melody, the checking of the volume, and the initializing of the flag variable are carried out.

Figure 14:
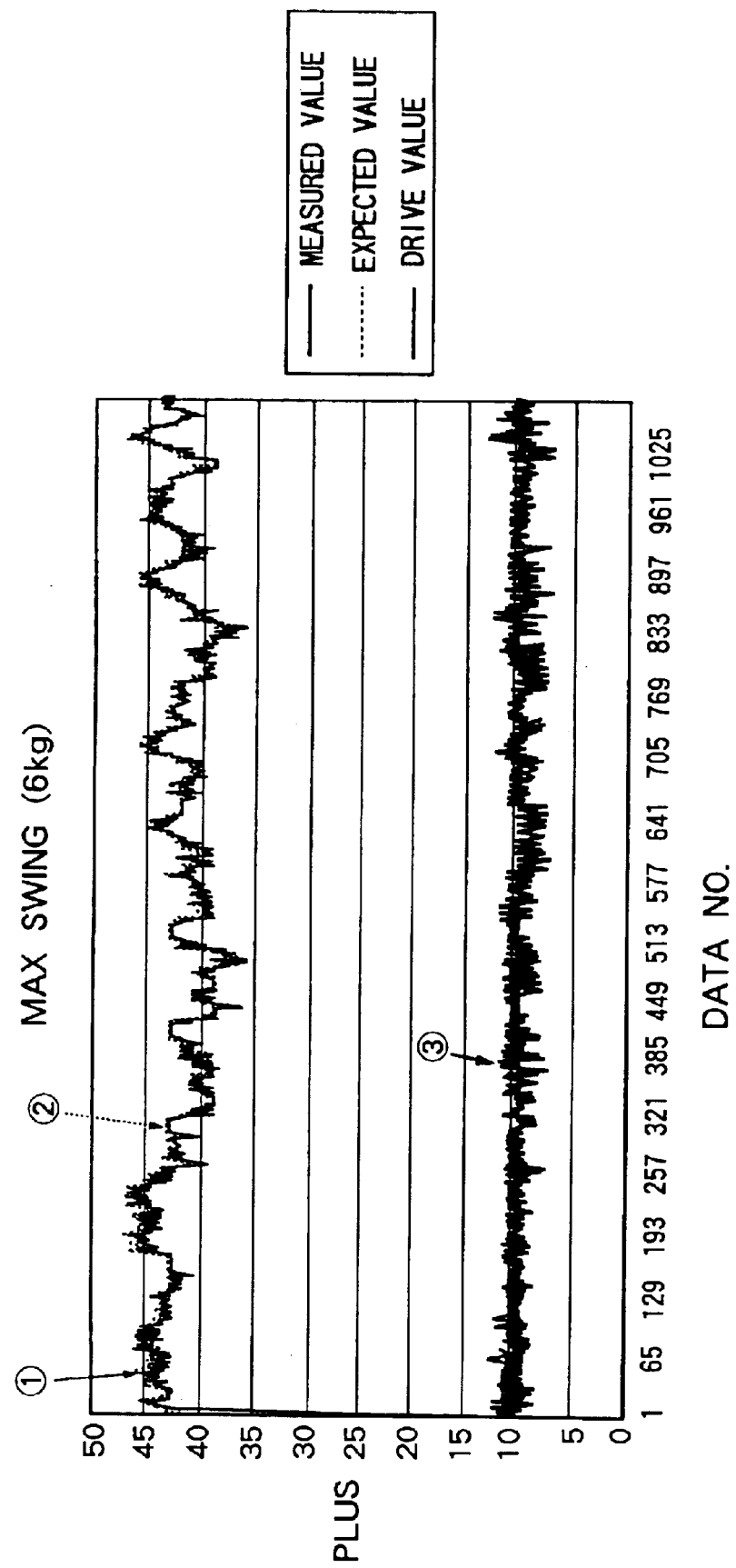
FIG. 14 is a view showing a first example of an evaluation result of the swing control device according to the present embodiment.
Figure 15:
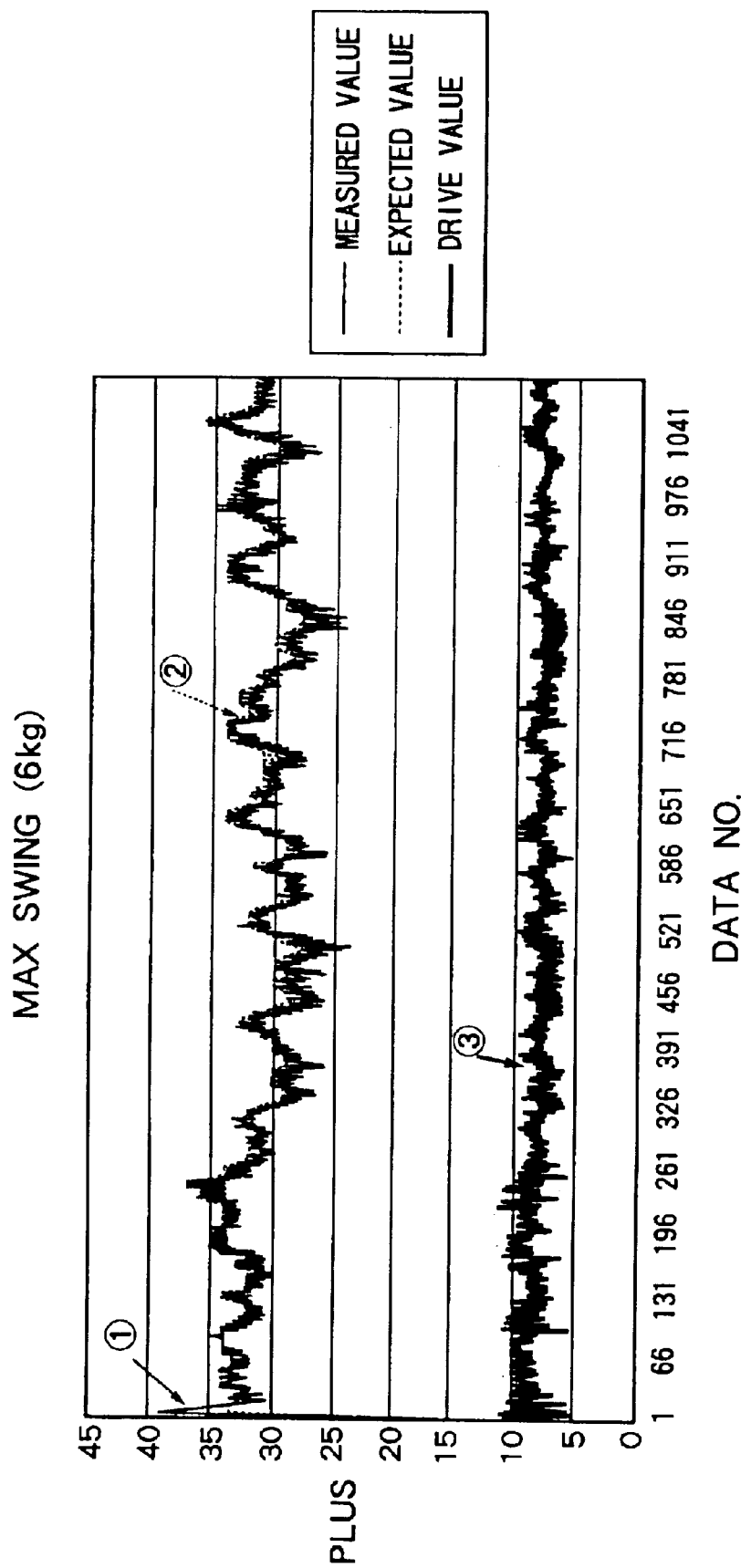
FIG. 15 is a view showing a second example of an evaluation result of the swing control device according to the present embodiment.
Figure 16:
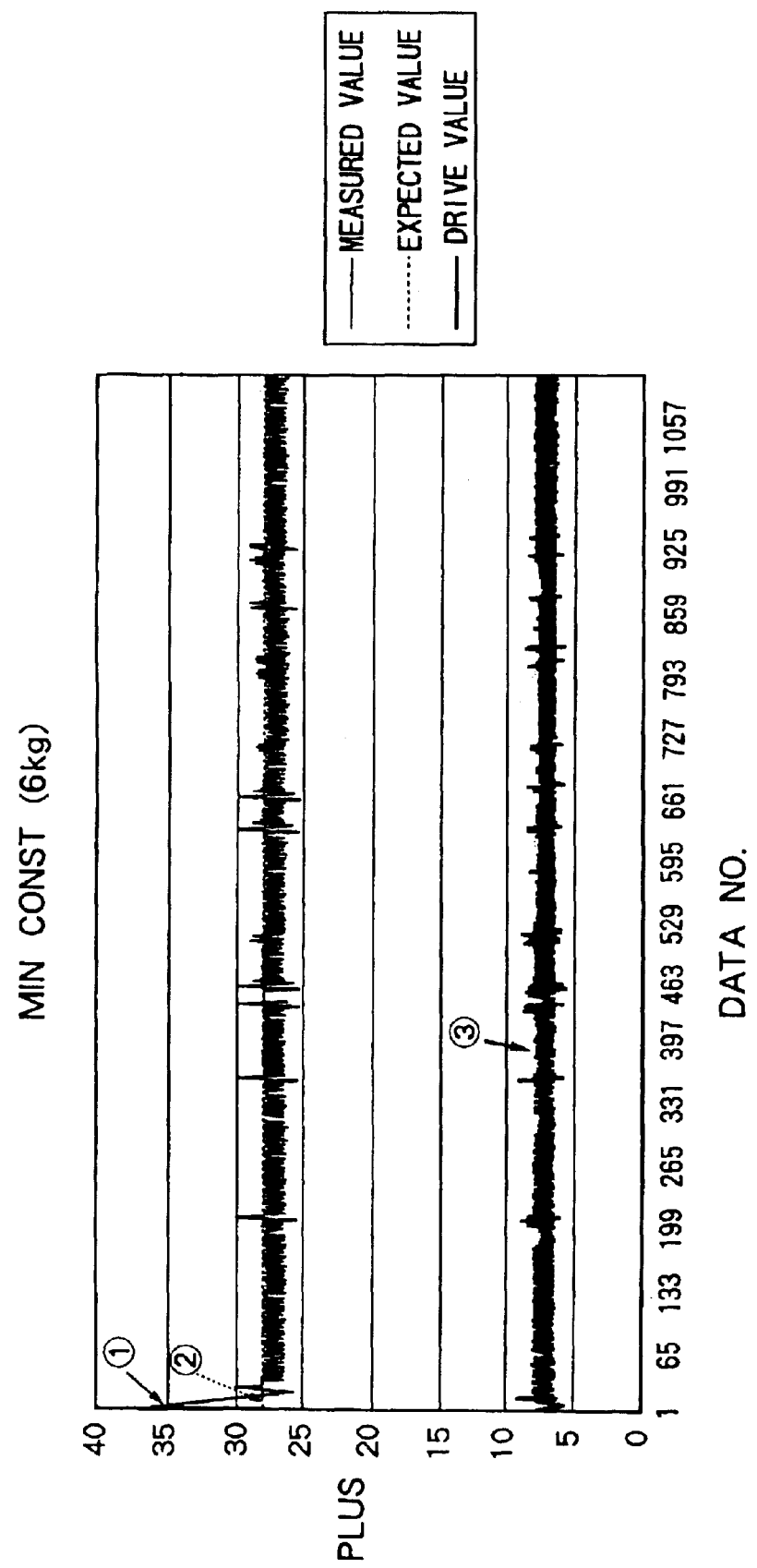
FIG. 16 is a view showing a third example of an evaluation result of the swing control device according to the present embodiment.

FIG. 14 is a view showing a first example of an evaluation result of the swing control device according to the present embodiment, FIG. 15 is a view showing a second example of an evaluation result of the swing control device according to the present embodiment, and FIG. 16 is a view showing a third example of an evaluation result of the swing control device according to the present embodiment.

FIG. 14 shows the evaluation result in the case of a maximum swing, FIG. 15 shows the evaluation result in the case of a minimum swing, and FIG. 16 shows the evaluation result when a uniform swing is realized.

In FIG. 14 to FIG. 16, the abscissa indicates data number and the ordinate indicates sensor position (position of the reflection mark), respectively.

Further, in FIG. 14 to FIG. 16, the waveform denoted by ① is the measured value (target value), the waveform denoted by ② is the expected value, and the waveform denoted by ③ is the drive value.

Also, the drive value corresponds to the pulse number of the drive pulse S15.

As shown in FIG. 14, when operating in the maximum swing, if the drive pulse number is set to approximately near 10, an expected value corresponding to the measured value can be obtained.

Similarly, as shown in FIG. 15, when operating in the minimum swing, if the drive pulse number is set to approximately about 8±2, an expected value corresponding to the measured value can be obtained.

Further, as shown in FIG. 16, when realizing a uniform swing, if the drive pulse number is set to approximately near 8, an expected value corresponding to the measured value can be obtained.

As explained above, according to the present embodiment, the phase of the reflection marks RMK1$a$ to RMK56$a$ of the first reflection mark row 141 is arranged such that it is delayed a half pitch from the phase of the reflection marks RMK1$b$ to RMK56$b$ of the second reflection mark row 142, and provides with the sensor portion 14 having the first reflection optical sensor 143 which emits light to the first reflection mark row 141 and receives the reflected light therefrom to output a first pulse signal S143 and the second reflection optical sensor 144 which emits light to the second reflection mark row 142 and receives the reflected light therefrom to output a second pulse signal S144, and the control circuit 15 which receives the first pulse signal 143 and the second pulse signal 144 to obtain sensor data DT1 and DT2 based on both pulse signals, decodes data patterns set in advance which corresponds to a combination of the sensor data DT1 and DT2, judges a swing direction or a change thereof from a changed pattern of the continuous data pattern, reads a target value (for example, the pulse count number) from a table set in advance to compare or the like with the pulse count number of the present, the previous, or the one before the previous to obtain a pulse width for driving at the next timing, and outputs the drive pulse S15 of the obtained pulse width to the drive circuit 122 so that driving can be performed in accordance with the expected value of the swing set in advance. Therefore it becomes possible to perform accurate drive control in response to the load the swinging body carries even if it carries infants of different weights, whereby highly precision swing can be realized.

Also, although the control circuit 15, as described above, based on the pulse signals S143 and S144 of the swing width of the infant chair 12, obtains a pulse width that corresponds to the expected value by judging the direction of the swing or the like, however, in addition to this, the expected value is changed temporally by a program to set a pulse width to which the so-called 1/f fluctuation is added, so it may also be formed so that the driving power of the solenoid 122 is fluctuated.

Figure 17:
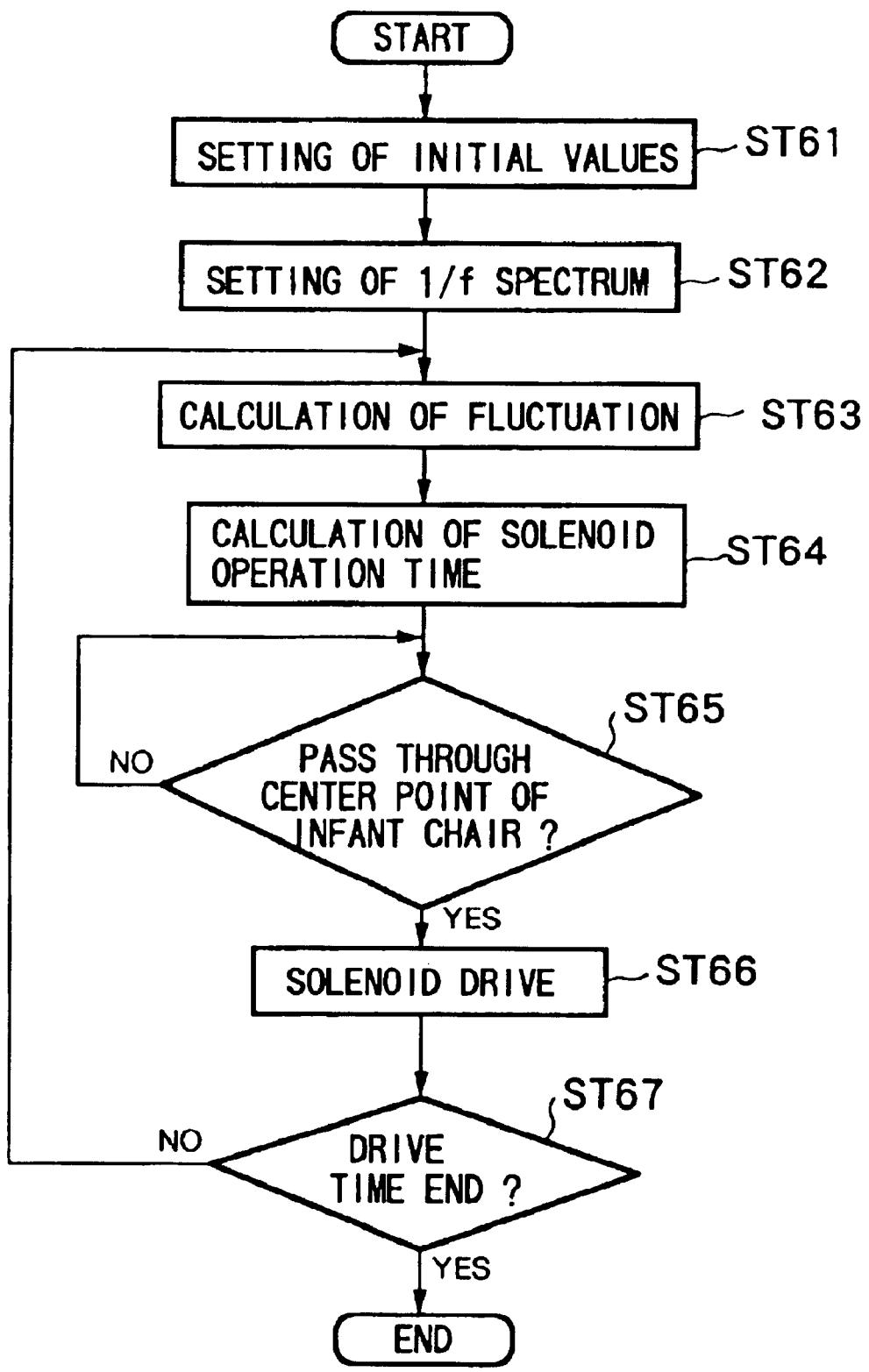
FIG. 17 is a flow chart for explaining the drive control of a solenoid 121 by setting a 1/f fluctuation added pulse width.

FIG. 17 is a flow chart for explaining the control of driving the solenoid 121 by setting a pulse width having the 1/f fluctuation added thereto.

Figure 18:
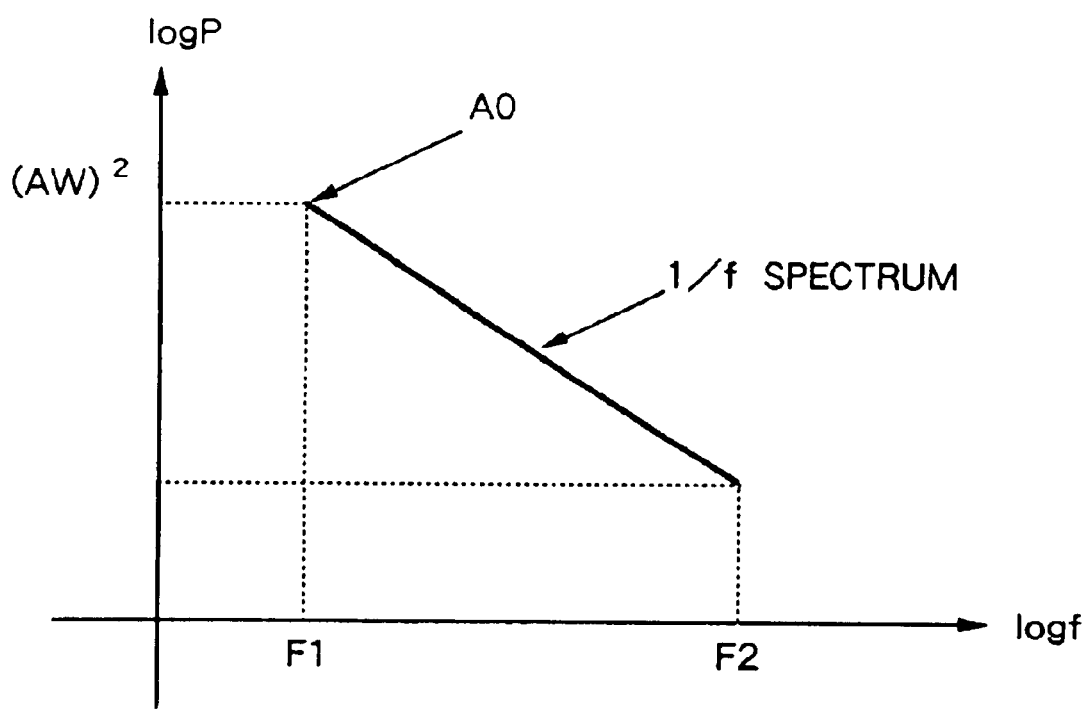
FIG. 18 is a view for explaining of the spectrum of a 1/f fluctuation.

Also, FIG. 18 is a view for explaining of the spectrum of the 1/f fluctuation.

In this case, setting of initial values is first performed (ST61).

When driving the infant chair 12, the necessary parameters of the initial values are as follows:

NN: Drive time (seconds)×100
F1: lower limit frequency of 1/f spectrum
F2: upper limit frequency of 1/f spectrum
AW: amplitude of sine wave in frequency F1
YDC: direct-current component of fluctuation Next, the setting of 1/f spectrum is performed (ST62).

The fluctuation waveform is obtained by dividing the frequency from F1 to F2 into 100 equal parts and superposing the sine wave of each frequency.

Then, the relation of a frequency $f_i$ and an amplitude $A_i$ of each sine wave is calculated so that a spectrum becomes a relation of 1/f. Put together, the phases of each sine wave are set by equal random numbers.

$$DF=(F2-F1)/100$$

$$f_i=F1+DF \times i \quad (i=0, 1, 2, \ldots, 100)$$

$$A_i=\{(A_0^2 \times F1)/f_i\}^{1/2} \quad \text{(Equation 1)}$$

Note that because calculating a trigonometric function needs time, the calculation is not performed during control but preferably stored in a table first.

Next, calculation of the fluctuation is performed (ST63).

Since a natural frequency of the infant chair 12 is for example about 0.8 seconds, the timing to operate the drive power becomes approximately 0.4 seconds, half of the natural frequency.

Therefore, the equation of the ωt of each sine wave is as follows:

$$\omega_i t_j = 2\pi f_i \times (360/2\pi) \times 0.4 \times j \; (j=0, 1, 2, \ldots) \quad \text{(Equation 2)}$$

Then, a fluctuation $Y_j$ is obtained from the following equation.

$$Y_j = YDC + \sum_{i=0}^{100} A_i \sin(\omega_i t_j + \phi i) \quad \text{(Equation 3)}$$

Next, calculation of a solenoid operating time is performed (ST64).

The 1/f spectrum waveform is converted into the solenoid operating time. In this case, the timer is set to for example 2 milliseconds (ms).

In the case of swinging the infant chair 12 at a constant operation time, because several tens of milliseconds (for example, 22 ms) is appropriate, a drive time $T_j$ is set as follows:

$$T_j = NT_j \times 2 \text{ ms} = \{(Y_j/5)+0.5\} \times 2 \text{ ms} \quad \text{(Equation 4)}$$

Next, the processes of confirmation of passing the central point of the infant chair 12 and the solenoid drive due to the drive pulse S15a are performed (ST65 and ST66).

The infant chair 12 passes the neutral point and the drive pulse S15a is output to the drive circuit 122 in synchronization with the pulse signals S143 and S144 transmitted from the sensor portion 14 and the flag of the timer.

Then, the processes from the calculation of the fluctuation in step ST63 to the solenoid drive of step ST66 are performed until the drive time ends (ST67).

By adopting such a structure, needless to say that it is possible to accurately control the drive in response to the load, there is an advantage that a comfortable swing such as the "1/f fluctuation" can be realized.

As described above, according to the present invention, it becomes possible to perform accurate drive control in response to the load the swinging body carries even if it carries infants of different weights, and there is also an advantage that a desirable swing can be realized with high accuracy.

While the invention has been described with reference to specific embodiment chosen for purpose of illustration, it should be apparent that numerous modifications could be made thereto by those skilled in the art without departing from the basic concept and scope of the invention.

What is claimed is:

1. A device for controlling the amplitude of a swinging body that swings back-and-forth about a predetermined axis, comprising:
    a driving means for driving the swinging body with a driving power corresponding to a supplied drive pulse,
    a sensor portion for detecting a swing width of the swinging body,
    a controlling means for obtaining a variable pulse width for driving the swinging body at the next timing which varies on the basis of the swing width detected by the sensor portion and an expected value of a swing set in advance to generate the drive pulse and supplying the drive pulse to the driving means.

2. A control device as set forth in claim 1, wherein the controlling means sets a pulse width with the addition of 1/f fluctuation.

3. A device for controlling the amplitude of a swinging body that swings back-and-forth about a predetermined axis, comprising:
    a driving means for driving the swinging body with a driving power corresponding to a supplied drive pulse,
    a sensor portion for detecting a swing width of the swinging body,
    a controlling means for obtaining a pulse width for driving the swinging body at the next timing on the basis of the swing width detected by the sensor portion and an expected value of a swing set in advance to generate the drive pulse and supplying the drive pulse to the driving means;
    wherein
    the sensor portion comprises
        a plurality of optical transmission mark rows in which a plurality of optical transmission marks transmitting irradiated light in a predetermined direction are arranged with predetermined intervals in the swing direction of the swinging body and the optical transmission marks of each row are arranged to be shifted at a predetermined pitch, and
        a plurality of optical sensors which irradiate light to each of the rows of optical transmission marks and receives the light transmitted by the optical transmission marks to output pulse signals in response to the received light level, and
    the controlling means obtains sensor data based on the pulse signals output by the plurality of optical sensors, decodes data patterns set in advance which corresponds to a combination of the sensor data, judges a swing direction from a changed pattern of the continuous data pattern, compares a target value set in advance with at least a present and previous drive value to obtain a pulse width for driving at the next timing, and outputs a drive pulse of the obtained pulse width to the driving means so that driving can be performed in accordance with an expected value of the swing set in advance.

4. A control device as set forth in claim 3, wherein the target value and drive value comprise a pulse count number.

5. A control device as set forth in claim 4, wherein the controlling means sets a pulse width with the addition of 1/f fluctuation.

6. A control device as set forth in claim 3, wherein the controlling means sets a pulse width with the addition of 1/f fluctuation.

7. A device for controlling the amplitude of a swinging body that swings back-and-forth about a predetermined axis, comprising:
    a driving means for driving the swinging body with a driving power corresponding to a supplied drive pulse,
    a sensor portion for detecting a swing width of the swinging body, a controlling means for obtaining a pulse width for driving the swinging body at the next timing on the basis of the swing width detected by the sensor portion and an expected value of a swing set in advance to generate the drive pulse and supplying the drive pulse to the driving means;

wherein the sensor portion comprises a first optical transmission mark row in which a plurality of optical transmission marks transmitting irradiated light in a predetermined direction are arranged with predetermined intervals in the swing direction of the swinging body, a second optical transmission mark row arranged in parallel with respect to the first optical transmission mark row and in which a plurality of optical transmission marks are arranged with predetermined intervals in the swing direction and the optical transmission marks are arranged to be shifted at a predetermined pitch with respect to those of the first optical transmission mark row, a first optical sensor which irradiates light to the first optical transmission mark row and receives the light transmitted by the optical transmission marks to output a first pulse signal in response to the received light level, and a second optical sensor which irradiates light to the second optical transmission mark row and receives the light transmitted by the optical transmission marks to output a second pulse signal in response to the received light level, and the controlling means obtains sensor data based on the first and second pulse signals, decodes data patterns set in advance which corresponds to a combination of the first and second sensor data, judges a swing direction from a changed pattern of the continuous data patted, reads a target value from a table set in advance to compare with a present drive value and at least a previous drive value to obtain a pulse width for driving at the next timing, and outputs a drive pulse of the obtained pulse width to the driving means so that driving can be performed in accordance with an expected value of the swing set in advance.

8. A control device as set forth in claim 2, wherein the target value and drive value comprise a pulse count number.

9. A control device as set forth in claim 2, wherein the controlling means sets a pulse width with the addition of 1/f fluctuation.

* * * * *